March 19, 1968   H. N. BEHNKE   3,373,637
MULTIPLE PURPOSE PORTABLE ROTARY DRIVE UNIT
Filed Jan. 14, 1966   3 Sheets-Sheet 1
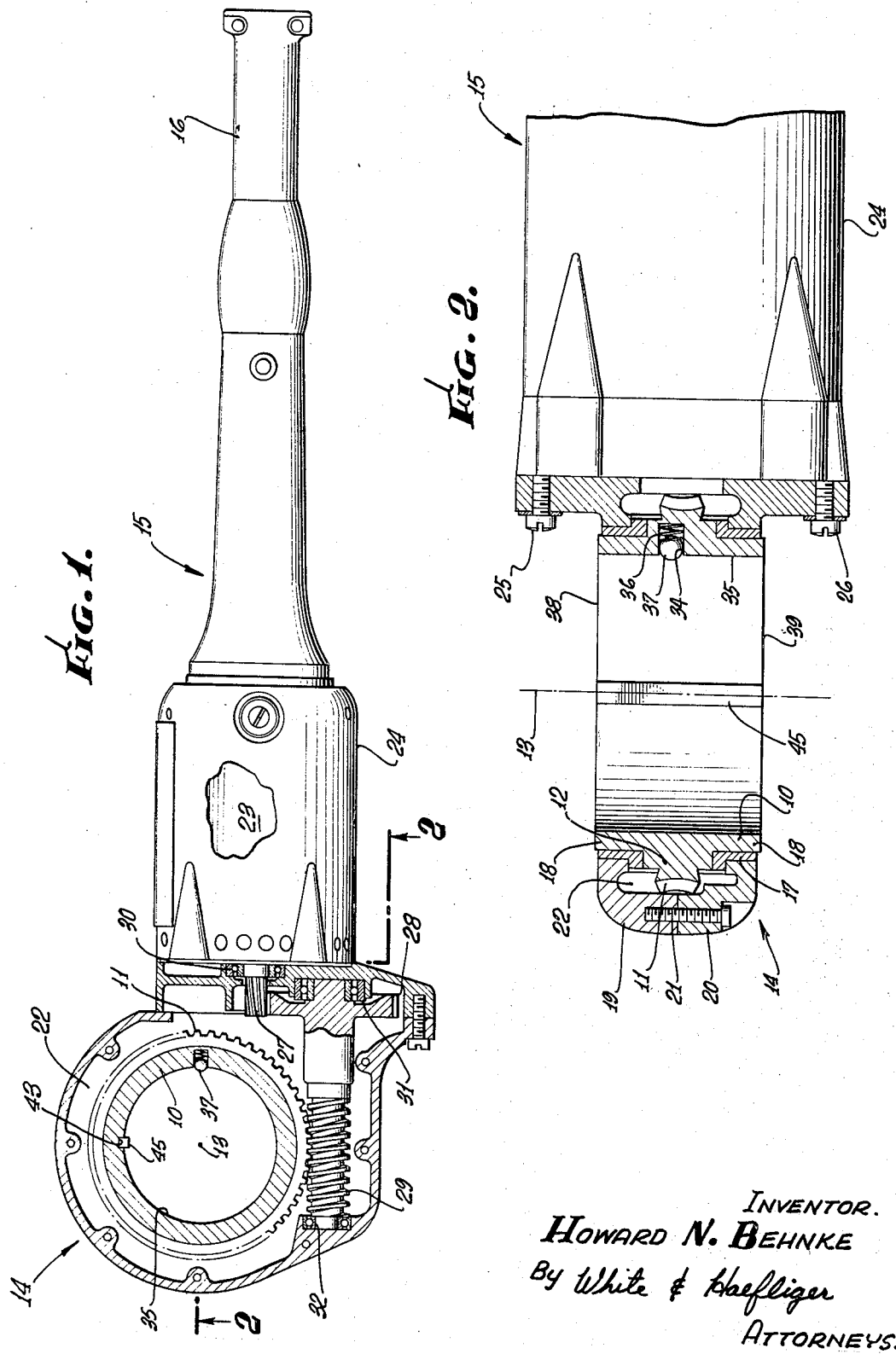
INVENTOR.
HOWARD N. BEHNKE
By White & Haefliger
ATTORNEYS.

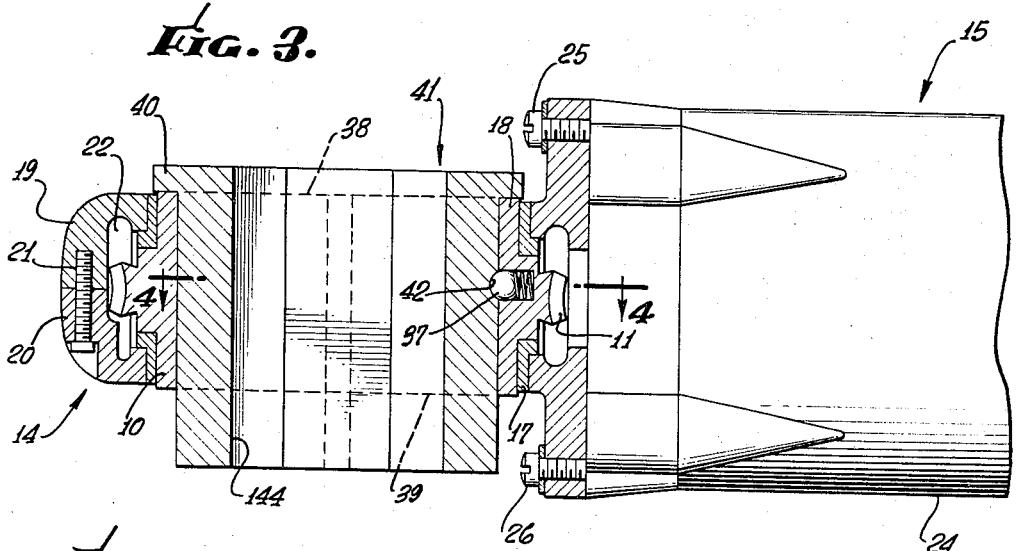
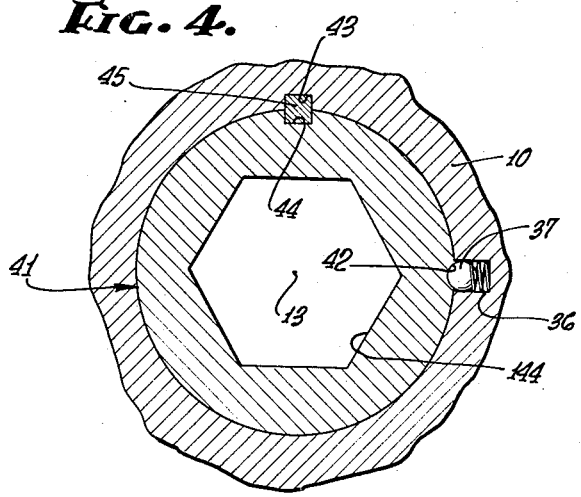
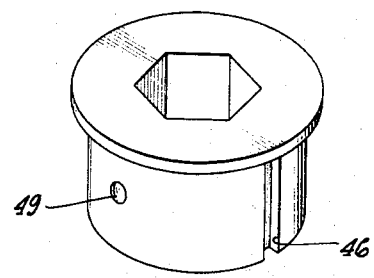
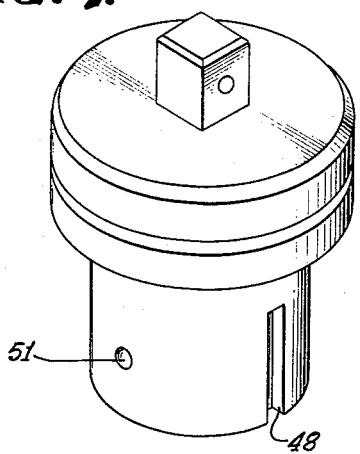
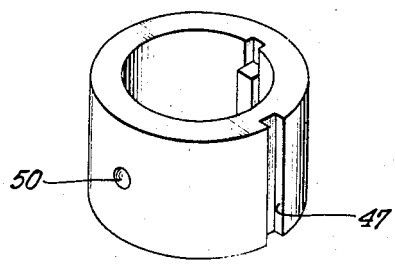

March 19, 1968   H. N. BEHNKE   3,373,637
MULTIPLE PURPOSE PORTABLE ROTARY DRIVE UNIT
Filed Jan. 14, 1966   3 Sheets-Sheet 3
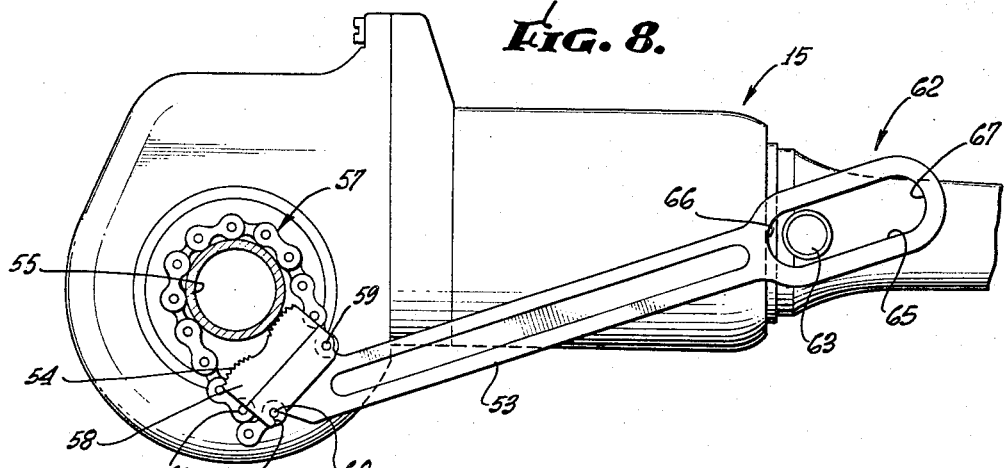
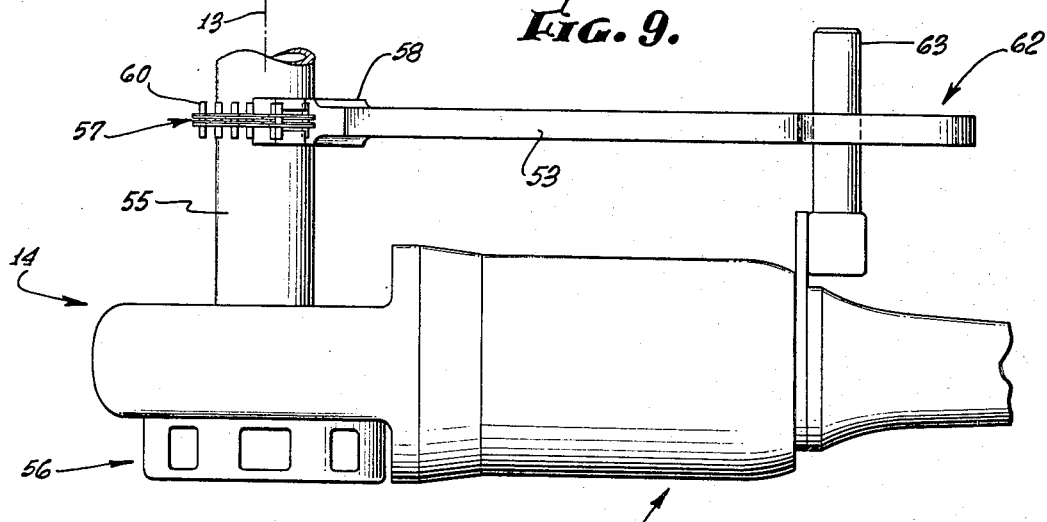
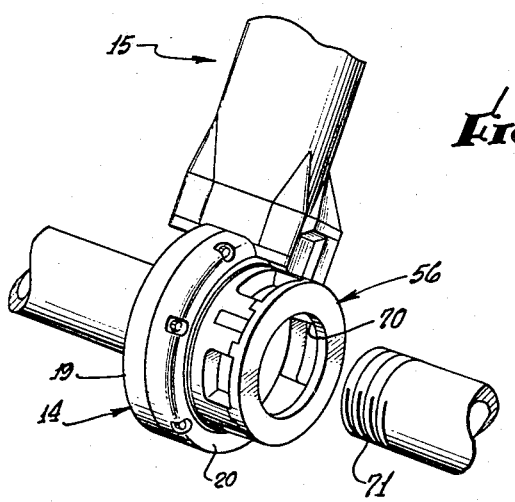
INVENTOR.
HOWARD N. BEHNKE
By White & Haefliger
ATTORNEYS.

3,373,637
MULTIPLE PURPOSE PORTABLE ROTARY
DRIVE UNIT
Howard N. Behnke, Monterey Park, Calif., assignor to Collins Machinery Corporation, Monterey Park, Calif., a corporation of California
Filed Jan. 14, 1966, Ser. No. 520,737
6 Claims. (Cl. 81—57)

ABSTRACT OF THE DISCLOSURE

The disclosed portable power drive assembly incorporates a rotary drive socket having a peripheral ring gear to which drive is transmitted by a motor via speed reducing gearing. The motor is carried by an arm integral with a housing supporting the socket, and the socket receives and retains an adapter to which drive is transmitted via a key in adapter and socket grooving. A holder may be provided to extend from the arm for attachment to work to resist counter-rotation of the arm about the work axis, and the holder provides a lost motion connection to permit adjustment.

This invention relates generally to portable power tools, and more particularly concerns improvements in a portable power rotary drive assembly capable of driving die heads and adapters for pipe threading and of driving torque transmitting devices, with high mechanical advantage.

Prior tools of the above type have generally lacked the unusual combinations and sub-combinations of structure, function and result embodied in the tool incorporating the present invention. Accordingly, it is a major object of the invention to provide an improved tool affording unusual advantages in structure, function and result, as will be described.

Basically, the improved portable power drive assembly of the invention comprises a drive socket having a peripheral ring gear defining a first axis of rotation, support means including a housing supporting the socket for rotation about that axis and having an arm extension projecting at one side of that axis, the extension having an handle, a drive motor supported by the arm extension, speed reducing gearing carried by the support means and connected to transmit drive from the motor to the ring gear at reduced speed, the socket constructed to receive axial insertion of a driven element, together with means carried to limit such axial insertion of the driven element into the socket and to removably interconnect the socket and driven element in torque transmitting relation whereby reduced speed drive is transmissible from the socket to the driven element. Typically, such means includes a spring urged detent carried by the socket substantially mid-way between axially opposite ends of the socket. Further, the driven element is typically in the form of an adapter having a groove sunk into its periphery to receive the detent urged inwardly toward the first axis, and the socket and adapter have registered grooves sunk therein to extend generally parallel to the first axis to receive a key inserted into the grooves.

A further important improvement feature of the tool concerns the provision of a holder integral with the arm extension and projecting generally toward an extension of the first axis for such engagement with work at that axis as to resist counter-rotation of the arm extension about the first or main axis. Typically, the holder is L-shaped and has a work gripping terminal proximate the axis extension. The terminal may advantageously have a serrated jaw to grip the work, and the holder may include a chain adapted to wrap about the work, together with means to detachably connect the chain to an elongated holder member that includes the terminal. Further, the holder typically includes a part projecting from the arm, and a lost motion connection between that part and the elongated holder member permitting adjustment shifting of the member toward and away from the axis extension, as will be described.

These and other objects and advantages of the invention, as well as the details of an illustrative embodiment, will be more fully understood from the following detailed description of the drawings, in which:

FIG. 1 is a side elevation, partly in section, showing the improved tool;
FIG. 2 is an enlarged fragmentary section taken on line 2—2 of FIG. 1;
FIG. 3 is a view like FIG. 2 but showing a driven element in the form of an adapter received by the tool;
FIG. 4 is an enlarged section taken on line 4—4 of FIG. 3;
FIGS. 5–7 are perspective showings of different adapters usable with the tool;
FIG. 8 is a side elevation showing that side of the tool hidden in FIG. 1;
FIG. 9 is a plan view showing the tool in position for threading pipe; and
FIG. 10 is a perspective showing of a pipe threading die head connected to the tool.

In the drawings the annular drive socket is shown at 10 as having a peripheral ring gear 11 formed on an annular boss 12 of the socket, the socket and gear defining a first axis 13 of rotation. The socket is supported for rotation about that axis by support means that includes a housing 14 having an arm extension 15 projecting at one side of the axis 13, the extension also including a handle 16. Further, such support means typically includes annular bushings 17 surrounding opposite end portions 18 of the socket and retained by the housing sections 19 and 20 which are interconnected at 21. Accordingly, the ring gear 11 is rotatable within the annular cavity 22 formed between the socket and the housing sections 19 and 20.

A drive motor 23 is supported by the arm extension 15 of the housing, and typically mounted within the cylindrical enlarged portion 24 thereof, the latter being attached to the housing sections 19 and 20 as by fasteners 25 and 26. Drive is transmitted from the motor to the ring gear 111 at reduced speed by speed reducing gearing carried by the support means, such gearing typically including a threaded stub shaft extension 27 of the motor shaft, spur gear 28 driven by stub shaft 27, and worm gear 29 integral with spur gear 28 and offset from axis 13 to mesh with the ring gear as indicated in the drawing. Suitable bearings for the gearing are seen at 30, 31 and 32.

Referring back to the socket, it is adapted to receive axial insertion of a driven element. In this regard, means is provided to limit such axial insertion and also to removably interconnect the socket and driven element in torque transmitting relation whereby reduced speed drive is transmissible from the socket to the driven element. Such means includes a spring urged detent carried by the socket between axially opposite ends thereof. As an example of this, FIGURE 2 shows a radial recess 34 sunk into the bore 35 of the socket and receiving a compression spring 36 and a ball 37 urged by the spring toward the axis 13, the ball being located substantially mid-way between opposite ends 38, 39 of the socket, yet somewhat closer to end 39 so as to interconnect the socket and driven element as seen in FIG. 3, only when that element is inserted via the end 38 of the socket. Note in this regard that the socket end 38 engages the flange 40 of the driven element 41 to limit such axial insertion. Note also that the element or adapter has a groove 42 sunk into its periphery to receive the detent ball for retaining the adapter in place and against axial withdrawal from the socket. Finally, the socket and adapter have registered grooves 43 and 44 as best seen in FIG. 4, and which are sunk therein to extend generally parallel to the axis 13, a key 45 being inserted into such grooves for transmitting torque from the socket to the adapter. The key and aligned grooves also align the detent ball 37 and the concave indentation 42 in order that the latter may receive the ball 37 upon completion of insertion of the adapter into the socket. As illustrated, the socket has a hexagonal opening 144 formed therein about the axis 13 to receive a correspondingly hexagonal work to be rotated, as for example, a nut or shaft.

FIGS. 5–7 show other forms of adapters which are likewise receivable into the socket. In each of these, there is a key receiving recess 46, 47, 48 and a detent ball receiving concave groove 49, 50 and 51 substantially as described in connection with FIG. 4. The concave grooves are offset approximately 90 degrees about the main axes of the adapters with respect to the key receiving grooves, as is also the case in FIG. 4.

Turning now to FIGS. 8–10, the invention also has to do with the provision of a holder integral with the arm extension and projecting generally toward an extension of the axis 13 for such engagement with the work at that axis as to resist counter-rotation of the arm extension 15 about the axis 13. The holder is typically L-shaped and includes an elongated member 53 spaced from the arm and having a serrated jaw terminal 54 for gripping the work, the latter taking the form of a pipe 55 in the drawing. Typically, the pipe is to be threaded as by the die head 56 driven by the socket in the manner previously described, such threading of the pipe tending to counter-rotate the arm extension about the axis 13.

The holder may also be considered to include a chain 57 adapted to wrap about the work or pipe, as well as means to detachably connect the chain to the terminal portion 58 of the member 53. In this regard, the chain may have permanent connection at 59 to the terminal, and it has lugs 60 spaced along the chain length and projecting laterally therefrom for reception within the recesses 61 formed by the terminal 58, as indicated. In a typical connection, the chain is wrapped about the pipe so as to closely fit the same, and the lugs 60 closest to the recess 61 are dropped therein, this manipulation being very easily accomplished by the user of the tool. As a result, the serrated jaw terminal 54 is caused to engage the periphery of the pipe or work blocking counter-rotation of the holder and of the tool arm extension 15 about the work.

The holder is accommodated to work of different sizes by a lost motion connection generally indicated at 62 between the elongated member 53 and a part 63 projecting from the arm extension 15. Such lost motion connection permits adjustment shifting of the member 53 and the jaw terminal 54 toward and away from the axis extension 13 defined by the work or pipe as illustrated. Specifically, the lost motion connection may be formed by the projection of the part 63 through an elongated slot 65 formed in the member 63. Limits 66 and 67 at opposite ends of the slot define the range of movement of the member 53 with respect to the part 63 engageable with such limits.

The die head 56 is shown in FIG. 10 to include thread chasers 70 which are rotatable with the head to thread the pipe at 71, as indicated. The pipe is insertable into the die head during threading from either end of the head, as accommodated by the whole socket 10, so as to permit left or righthand threading of the pipe end.

I claim:

1. In a portable power drive assembly, a drive socket having a peripheral ring gear defining a first axis of rotation, support means including a housing supporting said socket for rotation about said first axis and having an arm extension projecting at one side of said axis, said extension having a handle, a drive motor supported by said arm extension, speed reducing gearing carried by said support means and connected to transmit drive from the motor to said ring gear at reduced speed, the socket receiving axial insertion of a driven element in the form of an adapter, means carried to limit said axial insertion of the driven element into the socket and to removably interconnect the socket and driven element in torque transmitting relation whereby reduced speed drive is transmissible from the socket to said element, said last named means including a spring urged detent carried by the socket between axially opposite ends thereof, said adapter having a groove sunk into the periphery thereof to receive the detent urged inwardly toward said axis, said adapter and socket having registered key receiving grooves sunk therein to extend generally parallel to said axis, and a key inserted into said registered grooves.

2. The assembly of claim 1 including a holder integral with said arm extension and projecting generally toward an extension of said axis for such engagement with work at said axis as to resist counter-rotation of the arm extension about said axis.

3. The assembly of claim 2, in which said holder is L-shaped and has a work gripping terminal proximate said axis extension.

4. The assembly of claim 2, in which said holder is L-shaped and includes an elongated member spaced from said arm and having a serrated jaw terminal for gripping the work, a chain adapted to wrap about the work, and means to detachably connect the chain to said member.

5. In a portable power drive assembly, a drive socket having a peripheral ring gear defining a first axis of rotation, support means including a housing supporting said socket for rotation about said first axis and having an arm extension projecting at one side of said axis, said extension having a handle, a drive motor supported by said arm extension, speed reducing gearing carried by said support means and connected to transmit drive from the motor to said ring gear at reduced speed, the socket receiving axial insertion of a driven element in the form of an adapter, means carried to limit said axial insertion of the driven element into the socket and to removably interconnect the socket and driven element in torque transmitting relation whereby reduced speed drive is transmissible from the socket to said element, said last named means including a spring urged detent carried by the socket between axially opposite ends thereof, a holder integral with said arm extension and projecting generally toward an extension of said axis for such engagement with work as said axis as to resist counter-rotation of the arm extension about said axis, said holder being L-shaped and including an elongated member spaced from said arm and having a serrated jaw terminal for gripping the work, a chain adapted to wrap about the work, means to detachably connect the chain to said member, the holder also including a part projecting from said arm, and a lost motion connection between said part and member permitting shifting of the member toward and away from said axis extension.

6. In a portable power drive assembly, a drive socket having a peripheral ring gear defining a first axis of rotation, support means including a housing supporting said socket for rotation about said first axis and having an arm extension projecting at one side of said axis, said extension having a handle, a drive motor supported by said arm extension, speed reducing gearing carried by said support means and connected to transmit drive from the motor to said ring gear at reduced speed, the socket adapted to receive axial insertion of a driven element, means carried to limit said axial insertion of the driven element into the socket and to removably interconnect the socket and driven element in torque transmitting relation whereby reduced speed drive is transmissible from the socket to said element, a holder integral with said arm extension and projecting generally toward an extension of said axis for such engagement with work at said axis as to resist counter-rotation of the arm extension about said axis, said holder being generally L-shaped and including an elongated member spaced from said arm and having a serrated jaw terminal for gripping the work, a chain adapted to wrap about the work, and means to detachably connect the chain to said member, said holder also including a part projecting from said arm, and a lost motion connection between said part and member permitting shifting of the member toward and away from said axis extension.

References Cited

UNITED STATES PATENTS

| | | | |
|---|---|---|---|
| 437,459 | 9/1890 | Schoff | 74—425 X |
| 716,564 | 12/1902 | Longard | 81—68 |
| 810,738 | 1/1906 | Fesler | 81—66 |
| 858,894 | 7/1907 | Moss | 81—57 |
| 1,279,827 | 9/1918 | Barrall | 81—66 |
| 1,384,811 | 7/1921 | Strand | 81—57 |
| 1,415,772 | 5/1922 | Bessolo | 81—65 |
| 1,670,547 | 5/1928 | North | 81—58.5 |
| 2,578,279 | 12/1951 | Bardwell | 81—57 |
| 2,808,749 | 10/1957 | Lampke | 81—57 |

DONLEY J. STOCKING, *Primary Examiner.*

L. H. GERIN, *Assistant Examiner.*